United States Patent
Hudelmaier et al.

(10) Patent No.: US 8,954,244 B2
(45) Date of Patent: Feb. 10, 2015

(54) METHOD AND APPARATUS FOR ACTUATING AN AUTOMATED TRANSMISSION, IN PARTICULAR AN AUTOMATED TRANSMISSION OF A COMMERCIAL VEHICLE, AND TEST BENCH

(75) Inventors: Wolfgang Hudelmaier, München (DE); Wolfgang Zieglmaier, Haar (DE); Claus Hellberg, Markt Indersdorf (DE); Martin Weiner, Otterfing (DE); Georg Greppmeier, Jetzendorf (DE); Maximilian Huber, München (DE)

(73) Assignee: MAN Truck & Bus AG, Munich (DE)

(*) Notice: Subject to any disclaimer, the term of this patent is extended or adjusted under 35 U.S.C. 154(b) by 476 days.

(21) Appl. No.: 13/271,436

(22) Filed: Oct. 12, 2011

(65) Prior Publication Data
US 2012/0089308 A1  Apr. 12, 2012

(30) Foreign Application Priority Data
Oct. 12, 2010  (DE) .................. 10 2010 048 216

(51) Int. Cl.
G06F 7/00 (2006.01)
F16H 61/02 (2006.01)
F16H 59/14 (2006.01)
F16H 61/00 (2006.01)

(52) U.S. Cl.
CPC .......... *F16H 61/0213* (2013.01); *F16H 59/141* (2013.01); *F16H 59/14* (2013.01); *F16H 2061/0071* (2013.01)

USPC ............................................. 701/55

(58) Field of Classification Search
USPC .............. 701/51, 54, 55, 64, 67, 68, 95
See application file for complete search history.

(56) References Cited

U.S. PATENT DOCUMENTS

| | | | |
|---|---|---|---|
| 2002/0037790 A1* | 3/2002 | Carl et al. | 477/79 |
| 2002/0107626 A1* | 8/2002 | Graf | 701/54 |
| 2008/0275612 A1 | 11/2008 | Vesenjak | |

FOREIGN PATENT DOCUMENTS

DE   10 2005 057 809 A1   6/2007

* cited by examiner

*Primary Examiner* — Kim T Nguyen
(74) *Attorney, Agent, or Firm* — Laurence A. Greenberg; Werner H. Stemer; Ralph E. Locher

(57) ABSTRACT

A method for actuating an automated transmission, in particular an automated transmission of a commercial vehicle, which is coupled to a drive motor, where data and/or signals are supplied to a controller of the automated transmission via an interface. When a defined event occurs, a temporally predictive non-steady profile of the drive motor torque for this event is transmitted to the controller of the automated transmission. The transmission controller ascertains and/or specifies a transmission shifting strategy on the basis of the transmitted data. There is also provided an apparatus for actuating an automated transmission, and also a test bench.

18 Claims, 6 Drawing Sheets

METHOD AND APPARATUS FOR ACTUATING AN AUTOMATED TRANSMISSION, IN PARTICULAR AN AUTOMATED TRANSMISSION OF A COMMERCIAL VEHICLE, AND TEST BENCH

CROSS-REFERENCE TO RELATED APPLICATION

This application claims the priority, under 35 U.S.C. §119, of German patent application DE 10 2010 048 216.1, filed Oct. 12, 2010; the prior application is herewith incorporated by reference in its entirety.

BACKGROUND OF THE INVENTION

1. Field of the Invention

The invention relates to a method for actuating an automated transmission, in particular an automated transmission of a commercial vehicle. The invention also relates to an apparatus for actuating an automated transmission, in particular an automated transmission of a commercial vehicle. The invention, furthermore, covers a test bench which is suitable for a drive motor, in particular a drive motor of a commercial vehicle.

Performance test benches, or testing rigs, are regularly used to test newly developed drive motors, for example of diesel engines. It is possible to simulate and to analyze representative states for the drive motor using a performance test bench of this kind. As a result, certain trials can be performed on the test bench rather than on the road.

However, before a new drive motor can finally be authorized for series production, it is also necessary to test and to optimize the drive motor in terms of its compatibility with an automated transmission which is connected downstream of the drive motor and forms a constituent part of the drive train of the vehicle, in particular commercial vehicle. Both the drive motor and the automated transmission have a respective electronic controller. These controllers interact via at least one interface. An interface of this kind can, but does not have to, meet international standards, for example SAE 1939-71. For the tests and optimizations in respect of interaction between the drive motor and the transmission, applications by trial and comparative trips with a real vehicle are essential and result in relatively high costs. Therefore, with the current prior art, it is not possible to operate an automated manual transmission in, for example, a commercial vehicle without the transmission having to be matched to the drive motor or drive train of the vehicle, and this is complicated.

Patent Application Publication No. US 2008/0275612 A1 and its counterpart German published patent application DE 10 2005 057 809 A1 describe adapting to the respective operating situation in a method for controlling shifting in an automated manual motor vehicle transmission. At the beginning of the shifting process, at least one parameter which characterizes the current operating state of the motor vehicle and/or one shifting parameter which characterizes the provided shifting process is detected and evaluated, and the injection quantity of the drive motor, which injection quantity is associated with the idling torque, is matched to the operating state of the motor vehicle and/or to the shifting process in a variable manner in dependence on the evaluation result.

2. Summary of the Invention

It is accordingly an object of the invention to provide optimizations for the control of an automated transmission which overcome the disadvantages of the heretofore-known devices and methods of this general type and which simplifies and improves the application between a drive motor and an automated transmission in respect of the method and the apparatus. It is a further object to specify a suitable test bench for assisting an application of this kind.

With the foregoing and other objects in view there is provided, in accordance with the invention, a control method for actuating an automated transmission, wherein the transmission is coupled to a drive motor and data and/or signals are supplied to a transmission controller via an interface. The novel method comprises the following steps:

when a defined event occurs, transmitting a temporally predictive non-steady profile of a drive motor torque for the defined event to the transmission controller; and ascertaining and/or specifying a transmission shifting strategy with the transmission controller on a basis of the data so transmitted to the transmission controller.

In other words, the objects of the invention are achieved with a method for actuating an automated transmission which is coupled to a drive motor, with data and/or signals being supplied to a controller of the automated transmission via an interface. According to the invention, when a defined event occurs, a temporally predictive non-steady profile of the drive motor torque for just this event is transmitted to the controller of the automated transmission, and therefore the transmission controller, that is to say the controller of the automated transmission, ascertains and/or specifies a transmission shifting strategy on the basis of this transmitted data.

The expected (i.e., temporally predictive) profile or structure of the engine torque which is supplied to the transmission controller or the controller of the automated transmission according to the invention constitutes an important basis for a shifting process which is to be carried out in an optimized manner by the transmission controller software. The solution according to the invention considerably simplifies the application between the transmission and the drive motor since only the drive motor torque which can be or is ascertained in a simple manner on a test bench has to be supplied to the transmission or transmission controller as the main variable for the "vehicle force" for defined events. Therefore, a significant portion of the application work can be carried out in a simple manner on the test bench with the solution according to the invention, and therefore expensive trial journeys can be saved.

The non-steady engine torque profile is preferably transmitted and specified in the form of characteristic curves, with the characteristic curves for the respective event being ascertained in an engine-specific manner on a test bench.

A start-up process is preferably considered to be an event. In the simplest case, characteristic curves for at least the drive torque can be derived on the test bench for this event, and therefore, when a start-up process is detected, a temporally predictive non-steady profile of the drive motor torque can be transmitted to the transmission controller, the transmission controller ascertaining and/or specifying a transmission shifting strategy for the start-up process on the basis of the said profile of the drive motor torque.

In this case, the transmission controller advantageously ascertains a start-up rotation speed and/or a start-up gear on the basis of the transmitted profile of the drive motor torque.

Furthermore, an upshifting operation or a downshifting operation of the automated transmission can be considered to be an event. In the simplest case, characteristic curves for at least the drive torque can be derived on the test bench for these events, and therefore, when a shifting process of this kind is detected, a temporally predictive non-steady profile of the drive motor torque can be transmitted to the transmission controller, the transmission controller ascertaining and/or specifying a transmission shifting strategy for the upshifting operation or downshifting operation on the basis of the said profile of the drive motor torque. It is particularly advantageous, for the purpose of monitoring shifting operations and/or for the purpose of avoiding gear hunting, for the transmission controller to ascertain whether a shifting operation, that is to say a shifting process, is to be initiated or not, in particular whether the available torque is sufficient to initiate a shifting operation, that is to say a shifting process, on the basis of the transmitted profile of the drive motor torque, in order to achieve a defined engine behaviour, in particular a defined vehicle acceleration.

Furthermore, a change between overrun operation and traction operation or a drag operation can also be considered to be an event. In the simplest case, characteristic curves for at least the drive torque can be derived on the test bench for these events too, and therefore, when a change between overrun operation and traction operation or a drag operation is detected, a temporally predictive non-steady profile of the drive motor torque can be transmitted to the transmission controller, the transmission controller ascertaining and/or specifying a transmission shifting strategy for the respective change between overrun operation and traction operation or the respective drag operation on the basis of the said profile of the drive motor torque. This can take place, for example, in such a way that the transmission controller ascertains whether a change between overrun operation and traction operation or a change to drag operation is initiated or not on the basis of the transmitted profile of the drive motor torque. The engine brake can then further be switched on in the case of drag operation.

A particularly preferred refinement is one in which the non-steady engine torque profile, that is to say the non-steady profile of the drive motor torque, is specified to the transmission controller in an engine-specific manner as a function of the rating of the respective emissions stage, for example as an SCR emissions stage (SCR=selective catalytic reduction) or as a EURO-VI emissions stage to name just two examples, of the drive motor which is respectively coupled to the automated transmission.

According to a further preferred specific refinement, provision is made for at least the non-steady engine torque profile to be supplied to the transmission controller for defined events by means of a separate control device which is superordinate to the drive motor and to the automated transmission or by means of a separate control device which is coupled to the transmission controller or to the engine controller, at least one event-related engine torque profile being stored in the said control device such that it can be called up.

In addition or, however, primarily as an alternative to the above, provision can also be made, according to a less component-intensive, functionally integral solution, for at least the non-steady engine torque profile to be stored in the engine control device of the respective drive motor for defined events, the said non-steady engine torque profile being transmitted to the transmission controller via the interface when a defined event is detected and occurs.

In conjunction with the two above-mentioned variants, provision can further be made for at least the non-steady engine torque profile for defined events to be transmitted to the transmission controller or a controller for the drive motor by means of an EOL (end of line) programming operation, that is to say a programming operation of the control devices at the end of the assembly line.

It has been found that virtually all the loads on the drive motor which interact with an automated transmission in the commercial vehicle, said loads occurring during actual operation, can be attributed to the events specified above (a start-up process, an upshifting operation and a downshifting operation, a change from overrun operation to traction operation, drag operation) and it can be assumed that the specified events represent the highest requirements in respect of engine dynamics. As long as temporally predictive profiles in respect of the engine torque for the previously presented events can be made accessible to the transmission software, this can also be used in practice for other situations. Furthermore, it is fundamentally also possible to supply other temporally predictive profiles of other technical variables of the drive motor, such as injection quantities, charging pressures or else exhaust gas recirculation (AGR) rate.

With the above and other objects in view there is also provided, in accordance with the invention, an apparatus for controlling an automated transmission which is coupled to a drive motor, especially an apparatus that is configured to carry out the above-summarized method. The novel apparatus comprises:

an interface for supplying data and/or signals to a controller of the automated transmission;

a control device (either integrated in the control apparatus or connected to it and) connected to the interface, the control device holding non-steady and/or dynamic profiles of an engine torque for at least one defined event for forwarding to the controller of the automated transmission.

In other words, the objects of the invention related to the apparatus for actuating an automated transmission, which is coupled to a drive motor, of the kind specified above, are achieved in that an interface is provided, by means of which data and/or signals can be supplied to a controller of the automated transmission. According to the invention, non-steady and/or dynamic profiles of at least the engine torque are implemented for at least one defined event in a control device of the apparatus or in a control device which is coupled to the apparatus, and can be forwarded to the controller of the automated transmission.

A controller of this kind can, as already described above, preferably provide the expected profiles or the profiles, which correspond to a prognosis, of at least the engine torque by means of stored characteristic curves of the typical non-steady and/or dynamic profiles of the engine torque in the case of individual events (for example a start-up process, an upshifting operation or a downshifting operation, a change from overrun operation to traction operation, drag operation) by means of, for example, the conventionally used network CAN (Controller Area Network) of the controller of the automated transmission. This is accompanied in each case by optimization of the shifting process of the automated transmission. The ability to provide other engine variables for prognosis by the transmission controller or the software of said transmission controller is also within the scope of the invention. The implementation of such profiles can be called up in a time-dependent manner, such as by a software counter, by individual data sets which are stored in a one-dimensional or multi-dimensional manner. However, it is also possible to call up and output an obtained formation rule, for example a formula with time dependence.

With the above and other objects in view there is also provided, in accordance with the invention, a test bench for the drive motor in respect of the technical variables of the said drive motor which can be associated with it, in particular also relating to the dynamics thereof. At least one test program is provided in the test bench in order to simulate real loads on the commercial vehicle together with its automated transmission in relation to the drive motor and to make it possible to store and read out at least the time profile of the engine torque in association with the simulated loading events.

Events, preferably a start-up process, an upshifting operation or a downshifting operation, a change from overrun operation to traction operation or a drag operation, can be simulated by the test bench. Only the drive motor which is to be examined, generally a diesel engine in the case of a commercial vehicle, is associated with the test bench. The output shaft of the drive motor is connected in a rotationally fixed manner to an electrical machine, for example a three-phase asynchronous motor, which can be operated in generator mode and/or motor mode. The network of the commercial vehicle is replaced by a corresponding network of the test bench. The controller of the drive motor communicates with the network of the test bench. The time-dependent profiles of technical variables of the drive motor can be detected and stored with each event which is simulated on the test bench. These detected technical variables, in particular the engine torque and, in particular, in respect of the time profile thereof, can therefore be provided for the engine controller such that they can be read out for implementation purposes.

Other features which are considered as characteristic for the invention are set forth in the appended claims.

Although the invention is illustrated and described herein as embodied in the optimizations for actuating an automated transmission, in particular an automated transmission of a commercial vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 4A-4D are graphs illustrating the test cycles which are carried out using the test bench, wherein:

FIG. 4A) relates to the start-up cycle component;

FIG. 4B) relates to the upshifting operation cycle component;

FIG. 4C) relates to the cycle component which concerns the change between overrun operation and traction operation; and FIG. 4D) relates to the downshifting operation cycle component;

FIG. 5A) for start-up;

FIG. 5B) for upshifting operations;

FIG. 5C) for the change between overrun operation and traction operation; and

FIG. 5D) for downshifting operations.

DETAILED DESCRIPTION OF THE INVENTION

Information concerning the interaction between a drive motor and an automated manual transmission may be found, for example, in German published patent application DE 198 02 736 A1, which is herewith incorporated by reference.

Figure 1:
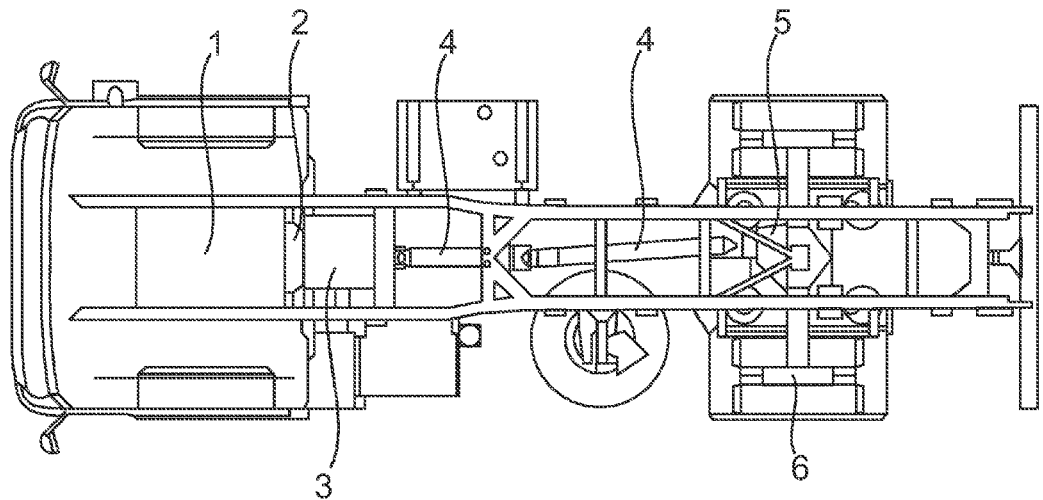
FIG. 1 is a schematic illustration of a commercial vehicle comprising the sub-assemblies of the drive train.

Referring now to the figures of the drawing in detail and first, particularly, to FIG. 1 thereof, there is shown a schematic drawing of a commercial vehicle, or heavy duty vehicle, which comprises, as assemblies of the drive train, the engine 1, the clutch 2, the automated transmission 3, the cardan shafts 4, the axle gear 5 and the hub gear 6.

Figure 2:
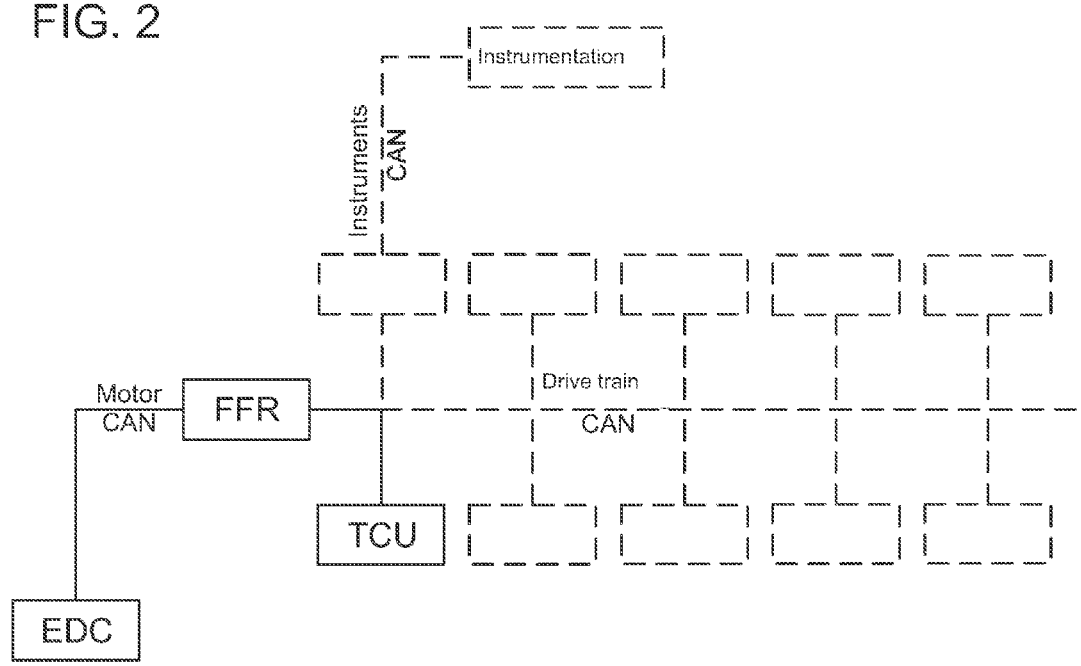
FIG. 2 is a schematic illustration of the connection of the engine control device with the transmission control device and other devices of the exemplary commercial vehicle.

Referring to FIG. 2, in the present case, a control device EDC is associated with the engine 1 and a control device TCU is associated with the transmission 3, including the clutch 2. A vehicle control computer FFR which is connected between the said control devices is connected to the control device EDC and to the control device TCU by means of a network CAN, as can also be seen in FIG. 2. Other blocks which are drawn in dashed lines in FIG. 2 and are not provided with abbreviated designations represent, by way of example, other devices of the commercial vehicle which, however, are not of further interest for the invention which is to be described herein.

Data is interchanged between the control device EDC and the control device TCU by numerous items of data and/or signals which are defined in the pertinent technical field, for example the interface protocol according to SAE 1939-71. However, further signals can be added or individual signals can also be left unused given a specific association between a control device EDC of the specific drive motor and a control device of a specific automated transmission.

The signals which relate to the torque which is actually generated by the engine and the actual rotation speed are primarily important for data interchange between the control device EDC and the control device TCU. These signals are sent by the engine control device EDC. The transmission control device can use this data to calculate and process variables which are important for operation of the said transmission control device.

Conversely, the transmission control device TCU can also send messages to the engine control device and, in the process, influence the decrease or increase in engine torque and the switching on and switching off of the engine brake. In the case of shifting operations of the automated transmission, it is necessary to decrease the engine torque as quickly as possible and, after the gear change has taken place, to increase the torque in a defined manner in accordance with the desired shifting dynamics. In the case of upshifting operations, it may be necessary to activate the engine brake if the moment of mass inertia is too great, in order to reach the rotation speed which is required for synchronization as quickly as possible. The transmission can influence the torque by means of the requested torque signal/torque limiting signal in the message "Torque/Speed Control". A percentage value is sent to the engine reference torque, this, however, first being checked by the vehicle control computer before it is forwarded to the engine or to the control device of the said engine as the requested torque.

Figure 3:
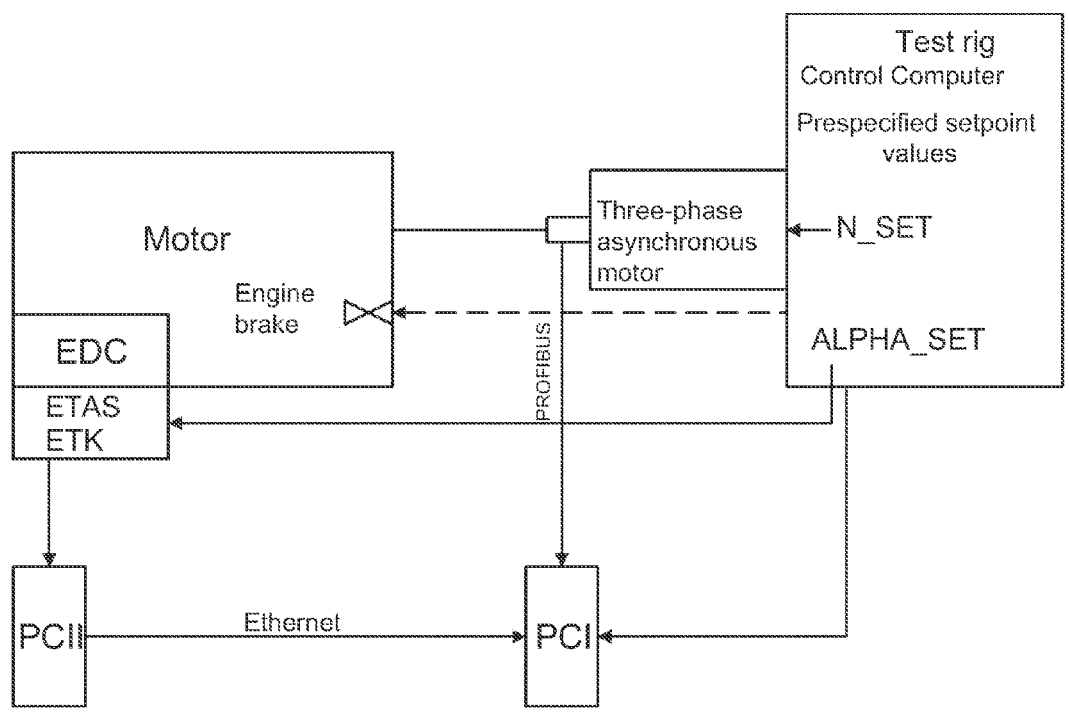
FIG. 3 is a schematic illustration of the test bench which is used within the scope of the invention.

FIG. 3 illustrates the test bench which is used. Only the drive motor together with its controller EDC is examined as an object to be tested in this test bench. The torque requests made in practical operation are generated, in relation to the engine shaft, by an electric motor with shunt characteristics, such as a three-phase asynchronous motor which ultimately can also be operated in generator mode, which is connected to a test bench computer and the engine control device EDC. The messages or signals actually sent during practical operation of the transmission control device are likewise simulated by the test bench computer itself or by additional smaller computers, such as PC I and PC II, and sent to the control device EDC by means of a network, such as Ethernet which simulates the network CAN which is used in practice. Messages and signals from the control device EDC are also sent by means of the network Ethernet for the purpose of superordinate evaluation by the test bench computer.

Within the scope of the invention, the described test bench is of particular importance in particular for the "dynamic" mode of operation (cycle). Therefore, the dynamic behaviour of the drive motor, usually a diesel engine, can be examined. The processes which are to be simulated in which the dynamic behaviour is relevant include, in particular, start-up processes, upshifting operations and downshifting operations and a change from overrun operation to traction operation. The aim of the simulated processes during trial or test operation is to obtain information as to how the torque generally behaves from the point-of-view of the transmission in the case of typical functions of the transmission. The software which is implemented, in particular, in the control device TCU of the transmission can then use this information to check whether the profile and the level of the torque in the preselected gear is sufficient to avoid incorrect shifting operations, before it initiates a shifting operation or selects a start-up gear.

The "dynamic" test cycle is based on real measurements made on the vehicle. Therefore, in order to once again make this clear, representative shift processes and start-up processes were selected and these were adapted, for carrying out trials on the engine test bench, by technical programs which are designed for this purpose. A test cycle comprises four successive individual cycles. These cycles are, in particular, four start-up processes, six upshifting operations, two changes between overrun operation and traction operation, and five downshifting operations.

Depending on the mode of operation, prespecified torque values and prespecified rotation speed profiles are simulated by the test bench before and after the positive engagement of the clutch. The gradients of the rotation speed profiles were likewise taken from measurements using a real vehicle.

Start-up processes are a compromise between the highest possible start-up gear and the wear on the clutch. In the start-up process, a suitable gear has to be selected so that the vehicle can start, in particular on a slope, taking into consideration the increase in dynamic load.

During the start-up process, the "Engine Requested Torque/Torque Limit" signal is requested by way of the software of the transmission.

Figure 4A:
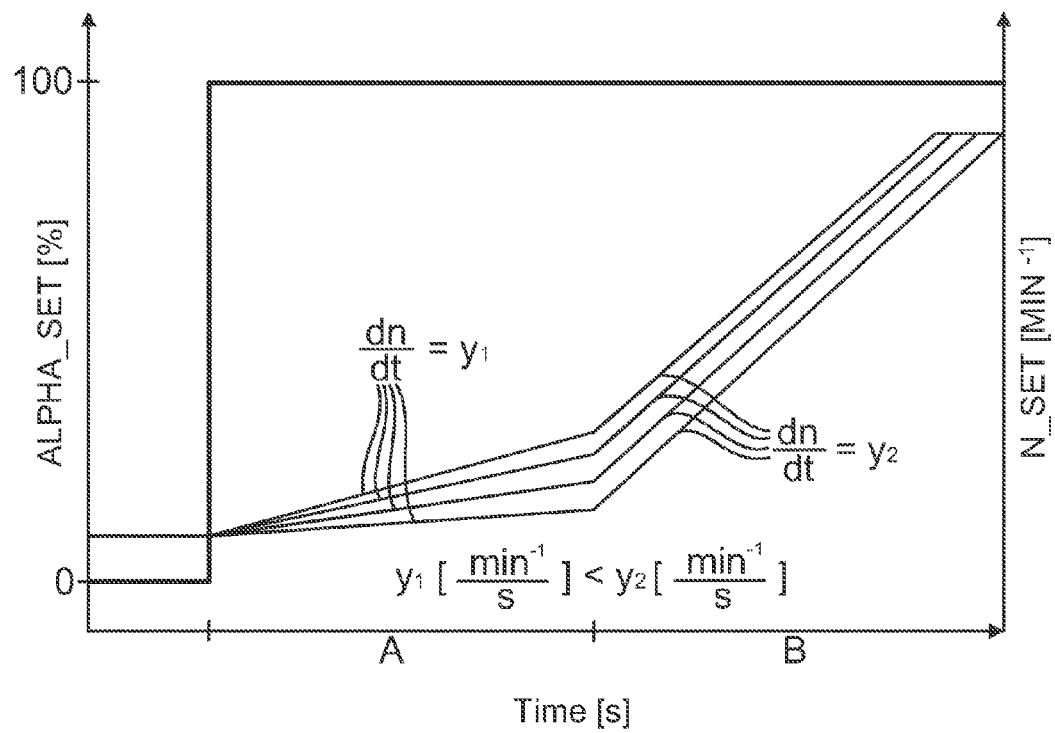

In other respects, the "start-up" cycle component is illustrated in FIG. 4A. The abscissa is divided into region A for the increase in torque and the simulated start-up process. Region B shows the positive engagement and the simulated driving mode. The ordinate on the left-hand side shows the predefined, standardized torque using ALPHA_SET. The rotation speeds N_SET are plotted along the ordinate on the right-hand side.

Figure 4B:
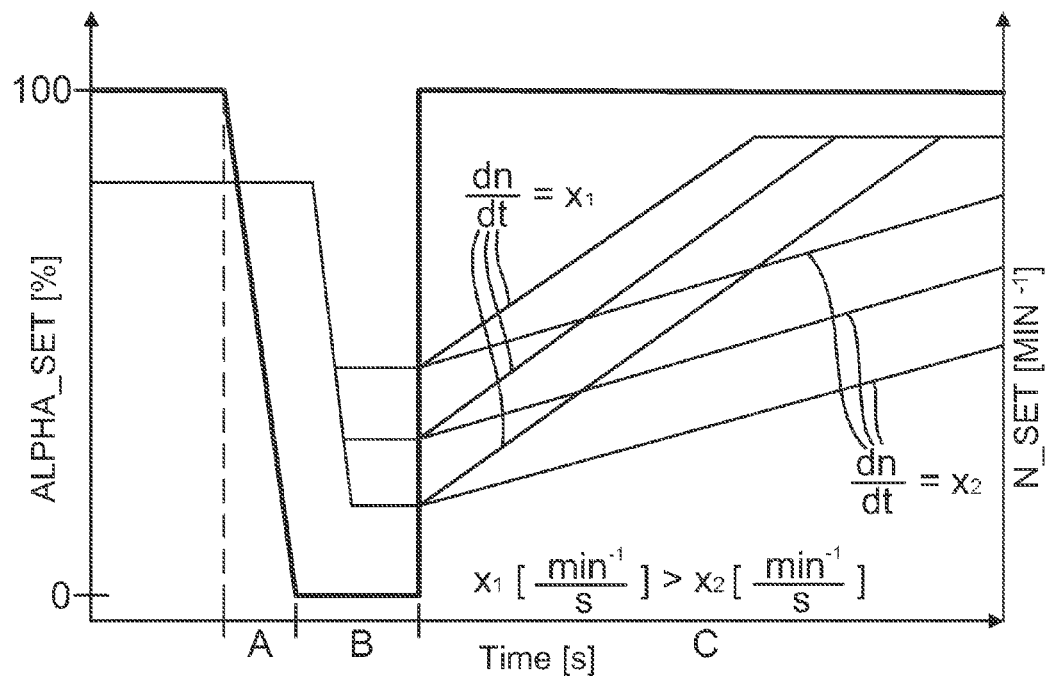

Upshifting operations are distinguished in that, starting from a high rotation speed level, the transmission is shifted to a lower rotation speed level on account of the change in the transmission ratio of the transmission by means of the jump in gear. In other respects, the "upshifting operation" cycle component is illustrated in FIG. 4B. The abscissa is divided. Region A shows the reduction in load. Region B shows the synchronization and the change in gear. Region C shows the increase in torque and the simulated driving mode.

Figure 4C:
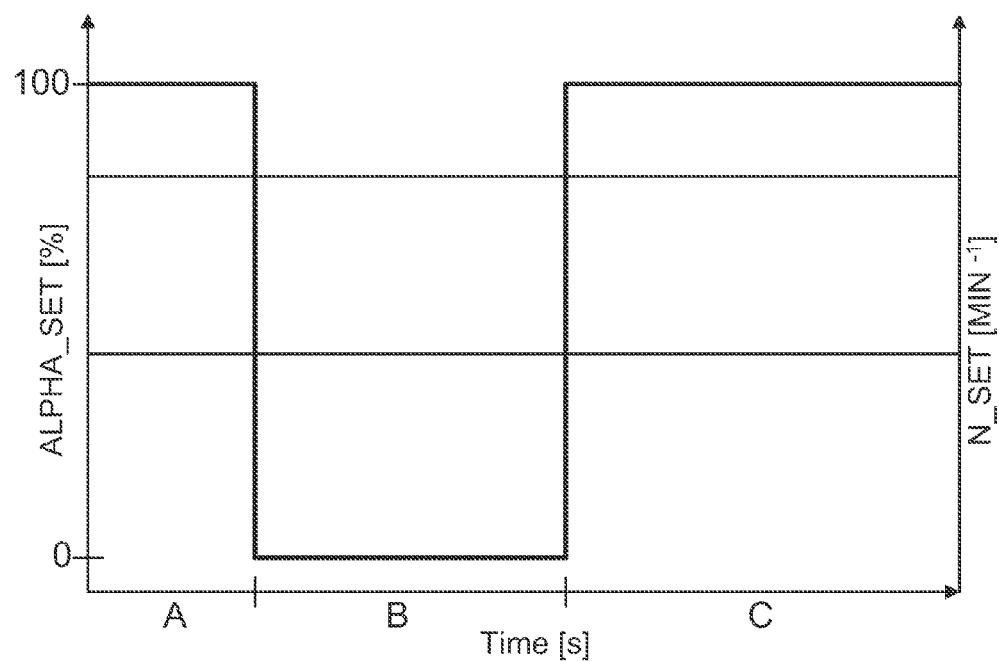

In the cycle component which concerns the "change between overrun operation and traction operation", a defined rotation speed is taken as a basis, the prespecified torque value is then reduced to a prespecified value, and then again raised to a further prespecified value, for example 100%, that is to say a changeover is made to traction operation. Reference is made to FIG. 4C in this respect. The abscissa is divided. Region A shows traction operation. Region B shows overrun operation. Region C shows traction operation.

Figure 4D:
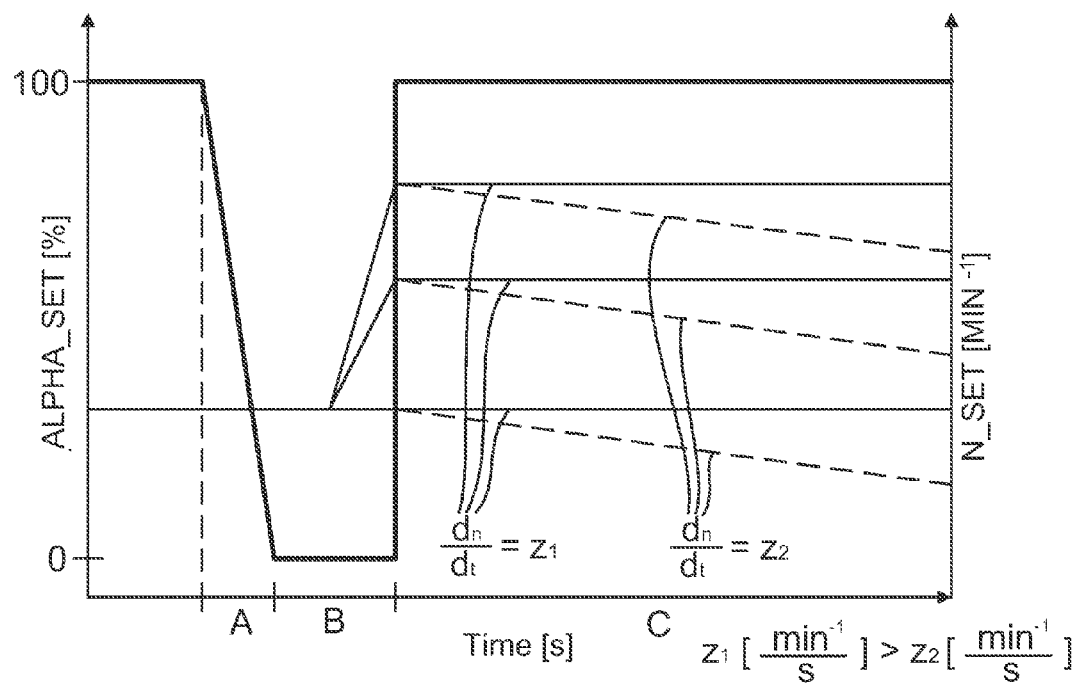

In the case of downshifting operations, the transmission shifts from a low engine rotation speed to a higher rotation speed level. Reference is made to FIG. 4D. The abscissa is divided. Region A shows the reduction in load. Region B shows the synchronization and the change in gear. Region C shows the increase in torque and the simulated driving mode.

Taking into account the trials on the test bench, it has been found that the increase in torque over time, as occurs in the case of typical functions of the transmission, is not known to the transmission and also is not taken into consideration by the software of the engine control device. However, it is necessary for the transmission or the controller of the said transmission to know, for example for calculating the start-up rotation speed, the rotation speed at which the engine can output which torque. Furthermore, in order to also include the vehicle traction force for monitoring shifting operations, the rotation speed profiles and the torque profiles, as occur in the event of shifting operations, have to be known to the controller.

Therefore, examinations were carried out to determine which torque profiles are produced for the above-described component cycles, specifically a simulated "start-up process," a simulated "upshifting operation," a simulated "downshifting operation," and a simulated "change between overrun operation and traction operation" for specific engines as units under test. In this case, other engine variables, such as intake torque, injection quantities, charging pressures, AGR (exhaust gas recirculation) rate, were additionally recorded.

As a result, it was possible to establish that there is a demonstrable time delay between the torque request and the increase in torque. In this case, it was possible to identify reproducible behaviour in respect of the increase in torque. The increase in torque can be described up until full load is reached over a gradient, starting from the intake torque—that is to say the engine torque without charging—even if the level of the full-load torque can change during operation of the vehicle. In contrast, the gradient of the torque is not influenced by means of these limits and retains its validity. In other respects, reference is made to the obtained characteristic curves relating to the torque profile in the case of start-up, compare FIG. 5A; in the case of upshifting operations, compare FIG. 5B; in the case of a change between overrun operation and traction operation, compare FIG. 5C; and in the case of downshifting operations, compare FIG. 5D, given a specific type of engine as the unit under test.

Figure 5A:
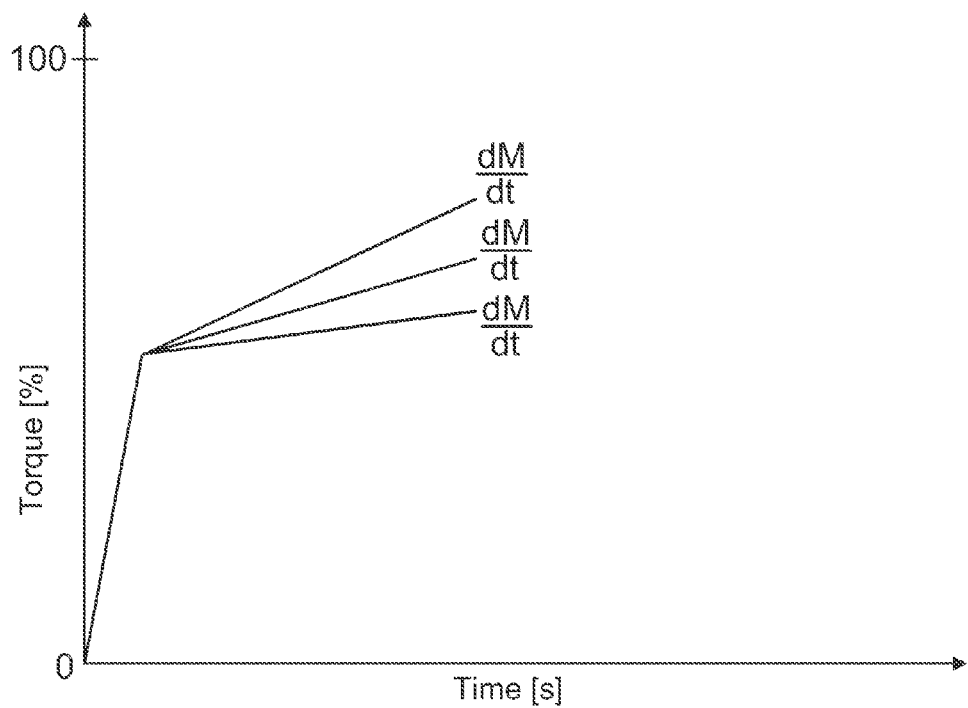
FIGS. 5A-5D are graphs illustrating the time-dependent characteristic curves for the engine torque, specifically.
Figure 5B:
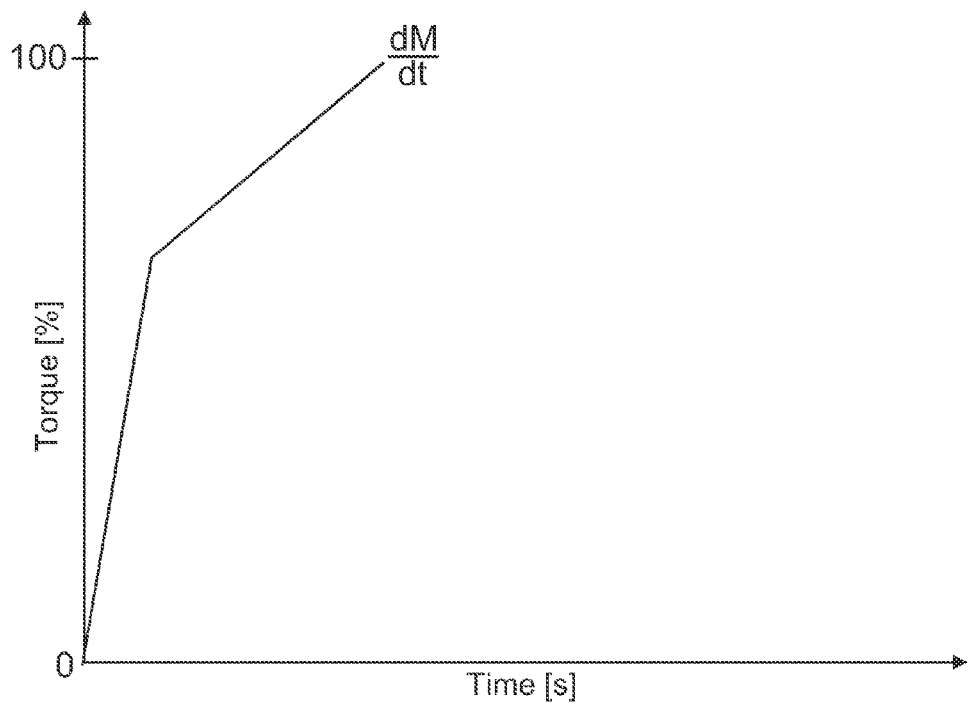
Figure 5C:
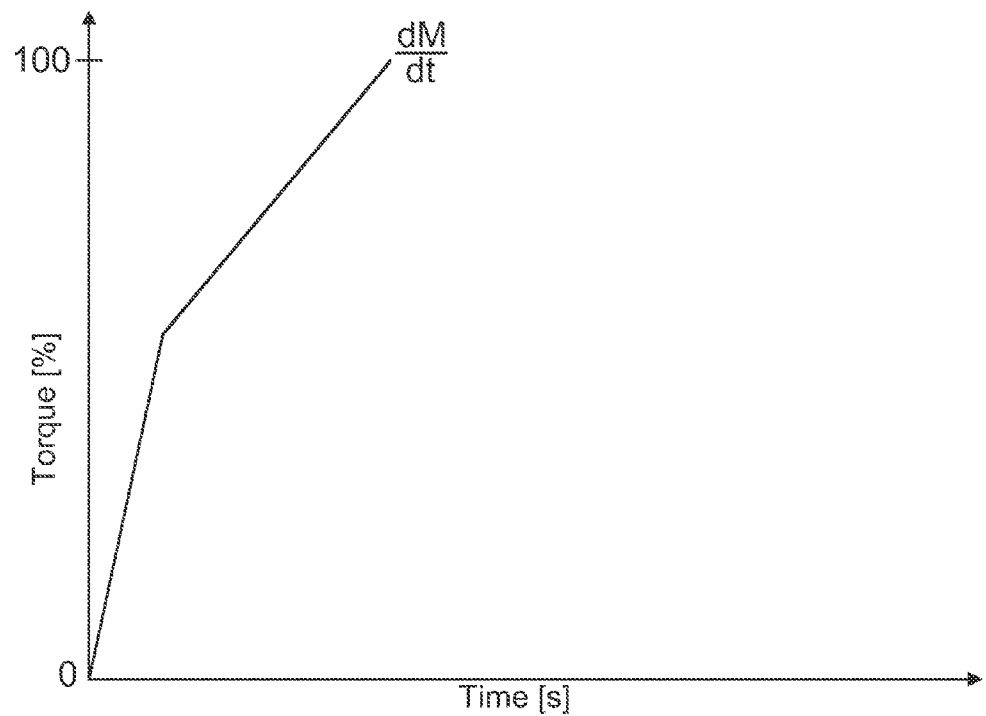
Figure 5D:
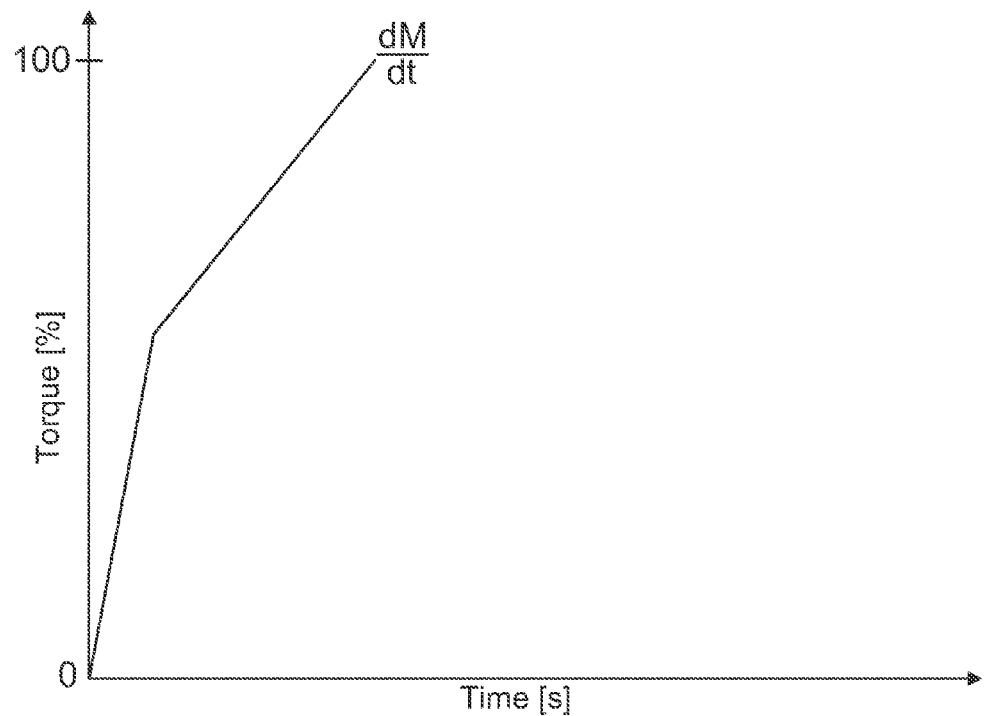

FIG. 5A illustrates the gradient for the increase in torque for various rotation speeds. FIG. 5B shows that the gradient for the increase in rotation speed is a specific value for all the examined upshifting operations up to the full-load torque. FIG. 5C shows that the gradient for the increase in rotation speed is likewise a specific value for all changes between overrun operation and traction operation up to the full-load torque. FIG. 5D finally shows that the gradient for the increase in rotation speed is likewise once again a specific value for all downshifting operations up to the full-load torque.

From among the results which have unmistakably led to a description of the engine dynamics, it should be noted that the gradient for the increase in rotation speed (in connection with the intake torque) is dependent on the charging pressure before shifting of the automated transmission, on the shifting time, the injection strategy, the target rotation speed and the rotation speed gradient. Even if these dependences are spread further out during the real driving mode, the invention produces characteristic curves which make the underlying dependences for the supply to the transmission control device possible. The stored values, which can also be stored in a multi-dimensional manner in a memory area of fundamentally any desired control or memory device, can be read out in a time-dependent manner by means of, for example, a counting function and be supplied to the transmission controller as a message within the meaning of a prognosis.

Overall, it has been found that upshifting operations and overrun change operations are extreme states and controlling the said states can also make it possible to control other operating states in the real driving mode. Upshifting operations are initiated starting from a very high charging pressure level and the shifting time was also found to be very short. This means that the characteristic curve which was derived from the upshifting operations represents the maximum possible dynamics of the increase in torque. In contrast to this, the changes from overrun operation to traction operation, which are characterized by a low charging pressure, represent the minimum possible case for the dynamics of the increase in torque. That is to say, all the profiles of the torque have to lie between these two characteristic curves. An average charging pressure level, and therefore an average intake torque and gradients for the increase in rotation speed, are represented by the characteristic curves from the downshifting operations.

The invention claimed is:

1. A control method for actuating an automated transmission, wherein the transmission is coupled to a drive motor and data and/or signals are supplied to a transmission controller via an interface, the method which comprises:
   when a defined event occurs, calling up a temporally predictive non-steady profile of a drive motor torque for the defined event being stored in a separate control, and transmitting the temporally predictive non-steady profile of the drive motor torque to the transmission controller, wherein the separate control device is superordinate to the drive motor and to the automated transmission or is coupled to the transmission controller or to an engine controller; and
   ascertaining and/or specifying a transmission shifting strategy with the transmission controller on a basis of the temporally predictive non-steady profile of the drive motor torque transmitted to the transmission controller.

2. The method according to claim 1, which comprises considering a start-up process as the defined event and, when the start-up process is detected, transmitting the temporally predictive non-steady profile of the drive motor torque to the transmission controller, and thereupon ascertaining and/or specifying with the transmission controller the transmission shifting strategy for the start-up process on the basis of the temporally predictive non-steady profile of the drive motor torque.

3. The method according to claim 2, which comprises ascertaining with the transmission controller a start-up rotation speed and/or a start-up gear on the basis of the temporally predictive non-steady profile of the drive motor torque.

4. The method according to claim 1, which comprises considering a shifting operation of the automated transmission, including an upshifting operation or a downshifting operation, as the defined event and, when the shifting operation is detected, transmitting the temporally predictive non-steady profile of the drive motor torque to the transmission controller, and thereupon ascertaining and/or specifying with the transmission controller the transmission shifting strategy for the upshifting operation or downshifting operation on the basis of the profile of the drive motor torque.

5. The method according to claim 4, which comprises, for a purpose of monitoring the shifting operations and/or for a purpose of avoiding gear hunting, ascertaining with the transmission controller whether or not a given shifting operation should be initiated.

6. The method according to claim 5, which comprises ascertaining with the transmission controller whether or not an available torque is sufficient to initiate one of the shifting operations leading to a defined engine behavior, including a sufficient vehicle acceleration.

7. The method according to claim 1, which comprises considering a change between overrun operation and traction operation or a drag operation as the defined event and, when the change between the overrun operation and the traction operation or the drag operation is detected, transmitting the temporally predictive non-steady profile of the drive motor torque to the transmission controller, thereupon ascertaining and/or specifying with the transmission controller the transmission shifting strategy for a respective change between the overrun operation and the traction operation or the respective drag operation based on the profile of the drive motor torque.

8. The method according to claim 7, which comprises ascertaining with the transmission controller whether or not the change between the overrun operation and the traction operation or the change to the drag operation is initiated based on the transmitted profile of the drive motor torque.

9. The method according to claim 1, which comprises specifying a non-steady engine torque profile to the transmission controller in an engine-specific manner as a function of a rating of a respective emissions stage of the drive motor that is respectively coupled to the automated transmission.

10. The method according to claim 1, which comprises transmitting a non-steady engine torque profile in a form of characteristic curves, the characteristic curves for a respective event having been ascertained in an engine-specific manner on a test bench.

11. The method according to claim 10, which comprises ascertaining the characteristic curves for the respective event on a test bench.

12. The method according to claim 1, which comprises transmitting signals between the engine controller and the transmission controller via the interface, with at least the temporally predictive non-steady profile of the drive motor torque being stored in the engine controller for defined events, and wherein the temporally predictive non-steady profile of the drive motor torque is transmitted to the transmission controller via the interface when the defined event is detected and occurs.

13. The method according to claim 1, which comprises transmitting at least the temporally predictive non-steady profile of the drive motor torque to the transmission controller or the engine controller by way of an EOL (end of line) programming operation.

14. The method according to claim 1, wherein the automated transmission and the drive motor are parts of a commercial vehicle.

15. An apparatus for controlling an automated transmission which is coupled to a drive motor, the apparatus comprising:
   an interface for supplying data and/or signals to a controller of the automated transmission;
   a control device connected to said interface, said control device holding non-steady and/or dynamic profiles of an engine torque for at least one defined event for forwarding to the controller of the automated transmission.

16. The apparatus according to claim 15, configured for carrying out the method according to claim 1.

17. The apparatus according to claim 15, wherein said control device is an integral part of the apparatus or said control device is coupled to the apparatus.

18. The apparatus according to claim 15, wherein said interface is a CAN (controller area network) interface.

* * * * *